B. P. STEDMAN.
STEERING DEVICE FOR AUTOMOBILES.
APPLICATION FILED MAY 26, 1917.
1,275,625.
Patented Aug. 13, 1918.
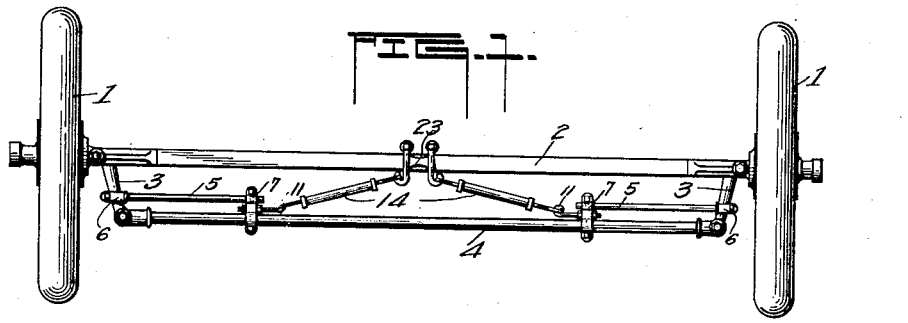
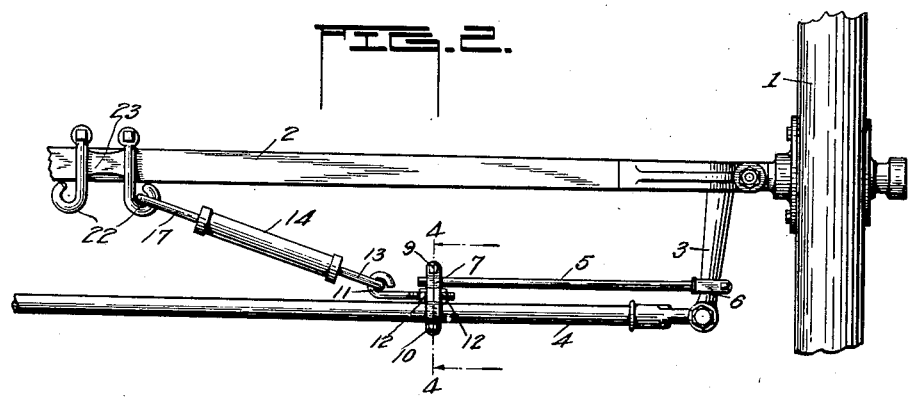
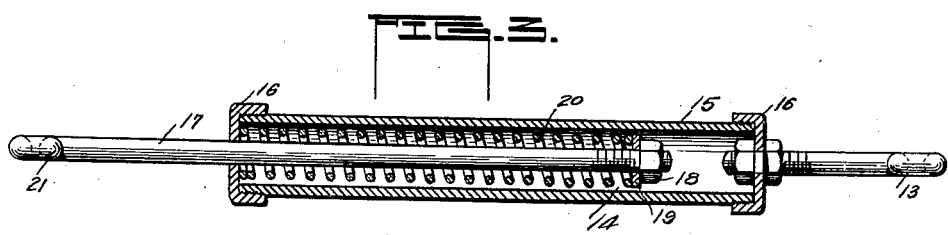
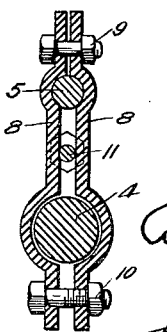
INVENTOR
Burton P. Stedman
McPate & Bean
ATTYS.

UNITED STATES PATENT OFFICE.

BURTON P. STEDMAN, OF PEORIA, ILLINOIS.

STEERING DEVICE FOR AUTOMOBILES.

1,275,625.  Specification of Letters Patent.  Patented Aug. 13, 1918.

Application filed May 26, 1917. Serial No. 171,150.

*To all whom it may concern:*

Be it known that I, BURTON P. STEDMAN, a citizen of the United States, a resident of Peoria, in the county of Peoria and State of Illinois, have invented new and useful Improvements in Steering Devices for Automobiles, of which the following is a specification.

This invention relates to improvements in steering devices for automobiles, and the principal object is the provision of such a mechanism which will return the front or steering wheels of a vehicle to their normal position after they are moved or jolted out of this position, so that if the steering wheel is released, the wheels of the vehicle will always cause the vehicle to move in a straight line.

A further object of my invention is the provision of such a device in the form of an attachment which may be readily applied to vehicles of standard construction.

Further objects include improvements in details of construction and arrangement, whereby a simply constructed mechanism is provided which will operate efficiently.

To the accomplishment of the foregoing and such other objects as may hereinafter appear, my invention consists in the combination, construction and arrangement of parts hereinafter described and then sought to be defined in the appended claims, reference being had to the accompanying drawings, forming a part hereof, and which show merely for the purpose of illustrative disclosure a preferred embodiment of my invention, it being understood that various changes may be made in practice within the scope of the claims without digressing from my inventive idea.

Figure 1 represents a top plan view of the front part of a chassis of a vehicle with a device constructed according to my invention, applied thereto;

Fig. 2 is a similar view on an enlarged scale of part of the mechanism shown in Fig. 1;

Fig. 3 is a detail section of one of the resilient elements;

Fig. 4 is a vertical section on line 4—4 of Fig. 2.

It frequently happens in operating a motor vehicle, that the operator will have difficulty in bringing the steering wheels back to their normal position after being moved or jolted out of this normal position and to overcome this disadvantage, I have provided a means which will return the wheels to their normal position, this means including resilient elements operating to hold the steering wheels in a normal straight position.

Referring now to the drawings, the numeral 1 designates the wheels mounted on the axle 2. The usual steering knuckle 3 is provided, the steering knuckles being connected by tie-rod 4, this part of the construction being of standard form.

My invention includes the mounting of an operating rod 5 on each steering knuckle by means of clamp 6. To the inner end of this operating rod 5 is connected the clamping member 7 which is formed of two like opposed parts 8, held in assembled relation by the bolt and nut 9 at the top, which clamps them to the rod 5 and also by the bolt and nut 10 at the bottom which is arranged so that the clamping member has a sliding fit on the tie-rod 4.

The eye 11 is connected to this clamp member by means of the nuts 12, this eye 11 being connected to the eye member 13 on one end of the resilient member 14. This resilient member includes the casing 15 having the end caps 16 and having the rod 17 slidably mounted therein, one end of this rod being provided with the nut 18 and washer 19 against which one end of the embracing coil spring 20 engages. The other end of coil spring 20 engages cap 16 so as to normally retract the rod 17. This rod 17 is formed with the eye 21 which engages in the hook 22 of the clip member 23 which is clamped to the axle 2. The tension of the spring 20 may be adjusted by means of the nuts 12 and also by means of the nut 18.

It is therefore seen that when the wheels of the vehicle are turned at an angle, one or the other of the springs 20 is compressed so that when the pressure on the steering wheel or on the wheels themselves is released, the spring which is compressed, acts to return the wheels to their normal straight position. Of course, it is recalled that the clamping member 7 is slidable on the tie-rod 4 and is loosely connected thereto, so as to permit the necessary movement in compressing the spring.

What I claim is:—

1. In combination with the axle, steering knuckles and tie-rod of a motor vehicle chassis, an operating rod clamped to the steering knuckle to move therewith, a clamping member connected to said operating rod and slidably mounted on said tie-rod, and a resilient member connected to said axle and to said clamping member, whereby, when the steering knuckles are moved in one direction, the resilient member will be compressed.

2. In combination with the axle, steering knuckles and tie-rod of a motor vehicle chassis, an operating rod connected to each steering knuckle, a clamping member connected to each operating rod and slidably mounted on said tie-rod, a resilient member connected to each clamping member, each resilient member being connected to the axle, whereby when the steering knuckles are moved in one direction, one resilient member will be compressed and when moved in the other direction, the other resilient member will be compressed so as to return the steering knuckles to their normal position when the turning pressure is released.

3. In combination with the axle, steering knuckles and tie-rod of a motor vehicle chassis, an operating rod connected to each steering knuckle, a clamping member mounted on each operating rod, said clamping member being composed of two parts and slidably mounted on the tie-rod, a resilient member connected to each clamping member and also to the axle, said resilient member including a casing, a rod member slidably mounted therein, and a coil spring embracing said rod and engaging a stop on the end thereof, said coil spring also bearing against one end of the casing so that when the steering knuckles are moved in either direction, one of the springs will be compressed.

4. In combination with the axle, steering knuckles and tie-rod of a motor vehicle chassis, a clip secured to said axle, a pair of resilient members detachably connected to said clip and diverging outwardly therefrom, a clamping member for each resilient member slidably mounted on the tie-rod of each of said clamping members being detachably connected to an operating rod, each of said operating rods being detachably secured to one of said steering knuckles so that when the steering knuckles are moved in either direction, one of said resilient members will be compressed.

5. In combination with the axle, steering knuckles and tie-rod of a motor vehicle chassis, a clip detachably secured to the axle, a pair of resilient members detachably connected to said clip and diverging outwardly therefrom, each of said resilient members including a casing, a rod having a stop on one end with a spring embracing the rod, and having one end engaging the stop and the other end engaging one end of the casing, a pair of clamping members slidably mounted on the tie-rod, one of said resilient members being connected to each clamping member, an operating rod connected to each clamping member and secured to one of said steering knuckles, whereby, when the steering knuckles are moved, one of said springs will be compressed.

BURTON P. STEDMAN.